(12) United States Patent
Zhao et al.

(10) Patent No.: US 10,340,786 B2
(45) Date of Patent: *Jul. 2, 2019

(54) HIGH FREQUENCY WIRELESS POWER RECTIFIER STARTUP CIRCUIT DESIGN

(71) Applicant: INTEGRATED DEVICE TECHNOLOGY, INC., San Jose, CA (US)

(72) Inventors: Lijie Zhao, San Jose, CA (US); Yue Wang, Santa Clara, CA (US); Stephen Ulbrich, Anaheim, CA (US)

(73) Assignee: Integrated Device Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/897,448

(22) Filed: Feb. 15, 2018

(65) Prior Publication Data

US 2019/0058392 A1 Feb. 21, 2019

Related U.S. Application Data

(63) Continuation of application No. 15/440,463, filed on Feb. 23, 2017, now Pat. No. 9,899,908.

(51) Int. Cl.
| | |
|---|---|
| *H02M 1/36* | (2007.01) |
| *H02M 7/217* | (2006.01) |
| *H02J 50/12* | (2016.01) |
| *H02J 7/02* | (2016.01) |
| *H02M 1/00* | (2006.01) |

(52) U.S. Cl.
CPC ............. *H02M 1/36* (2013.01); *H02J 7/025* (2013.01); *H02J 50/12* (2016.02); *H02M 7/217* (2013.01); *H02M 2001/0006* (2013.01)

(58) Field of Classification Search
CPC .......... H02N 1/36; H02N 7/217; H02N 7/219; H02N 2007/2195
See application file for complete search history.

(56) References Cited

U.S. PATENT DOCUMENTS

| | | | | |
|---|---|---|---|---|
| 6,563,726 | B1 * | 5/2003 | Hirst ................. | H02M 7/219 363/127 |
| 9,621,069 | B2 * | 4/2017 | Mauder ............... | H02M 7/217 |
| 2003/0095423 | A1 * | 5/2003 | Hirst ................. | H02M 7/219 363/127 |
| 2009/0066400 | A1 * | 3/2009 | Fischer ............. | H03K 17/04126 327/375 |
| 2011/0199799 | A1 * | 8/2011 | Hui .................. | H02M 7/219 363/127 |
| 2012/0014145 | A1 * | 1/2012 | Koike ............... | H02M 1/36 363/49 |
| 2012/0314456 | A1 * | 12/2012 | Lanni ............... | H02M 1/4258 363/21.02 |
| 2013/0033904 | A1 * | 2/2013 | Ye .................. | H02M 3/33576 363/17 |
| 2014/0104909 | A1 * | 4/2014 | Kwong .............. | H02M 7/219 363/127 |

(Continued)

*Primary Examiner* — Yusef A Ahmed
(74) *Attorney, Agent, or Firm* — Haynes and Boone, LLP

(57) ABSTRACT

A rectifier circuit can include a plurality of FETs arranged as a rectifier; and a start-up circuit applied to each of the plurality of FETs that turn each of the FETs off during a circuit startup period, wherein the start-up circuit provides a large impedance for low power dissipation during normal operation of the rectifier.

16 Claims, 8 Drawing Sheets

(56) References Cited

U.S. PATENT DOCUMENTS

| | | | |
|---|---|---|---|
| 2014/0104910 A1* | 4/2014 | Kwong | H02M 7/219 363/127 |
| 2014/0268956 A1* | 9/2014 | Teren | H02M 7/219 363/89 |
| 2015/0085547 A1* | 3/2015 | Hui | H02M 7/219 363/127 |
| 2016/0043657 A1* | 2/2016 | Mauder | H02M 7/217 363/127 |
| 2016/0079854 A1* | 3/2016 | Kinzer | H02J 7/0052 323/271 |
| 2016/0358705 A1* | 12/2016 | Lin | H01F 27/06 |
| 2017/0179846 A1* | 6/2017 | Hui | H02M 7/219 |

* cited by examiner

HIGH FREQUENCY WIRELESS POWER RECTIFIER STARTUP CIRCUIT DESIGN

RELATED APPLICATIONS

This disclosure is a continuation of U.S. patent application Ser. No. 15/440,463, filed Feb. 23, 2017, which is herein incorporated by reference in its entirety.

TECHNICAL FIELD

Embodiments of the present invention are related to wireless power systems and, specifically, to start-up in a high frequency wireless power rectifier.

DISCUSSION OF RELATED ART

Mobile devices, for example smart phones and tablets, are increasingly using wireless power charging systems. However, rectifier startup has increasingly become a problem, especially in higher frequency systems. Rectifier startup is difficult due to the capacitance between the gate and drain of the high voltage transistors used in rectifiers of the receiver system. In some devices, the gate-to-drain capacitance may exceed the gate-to-source capacitance. The high capacitance may cause delays in turning on (or off) the high voltage transistors during initialization of the wireless power receiver.

Therefore, there is a need to develop better circuitry to start the rectifier used in wireless power systems.

SUMMARY

Embodiments of the present disclosure provide a rectifier circuit with a start-up circuit. In accordance with some embodiments, a rectifier includes a first transistor and a second transistor coupled in series between a rectifier output and a ground, wherein a first AC input is coupled to a first node between the first transistor and the second transistor; a third transistor and a fourth transistor coupled in series between the rectifier output and the ground, wherein a second AC input is coupled to a second node between the third transistor and the fourth transistor; a first control circuit coupled between a gate of the first transistor and a gate of the fourth transistor to control operation of the first and the fourth transistor; and a first startup circuit coupled between the gate of the first transistor and the first node, the first startup circuit controlling the gate of the first transistor in a startup time period prior to an operating period of the rectifier.

A rectifier circuit can include a plurality of FETs arranged as a rectifier; and a start-up circuit applied to each of the plurality of FETs that turn each of the FETs off during a circuit startup period, wherein the start-up circuit provides a large impedance for low power dissipation during normal operation of the rectifier.

Additional aspects, features, and advantages of the present disclosure will become apparent from the following detailed description.

DETAILED DESCRIPTION

In the following description, specific details are set forth describing some embodiments of the present invention. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure.

This description and the accompanying drawings that illustrate inventive aspects and embodiments should not be taken as limiting—the claims define the protected invention. Various changes may be made without departing from the spirit and scope of this description and the claims. In some instances, well-known structures and techniques have not been shown or described in detail in order not to obscure the invention.

Elements and their associated aspects that are described in detail with reference to one embodiment may, whenever practical, be included in other embodiments in which they are not specifically shown or described. For example, if an element is described in detail with reference to one embodiment and is not described with reference to a second embodiment, the element may nevertheless be claimed as included in the second embodiment.

Figure 1:
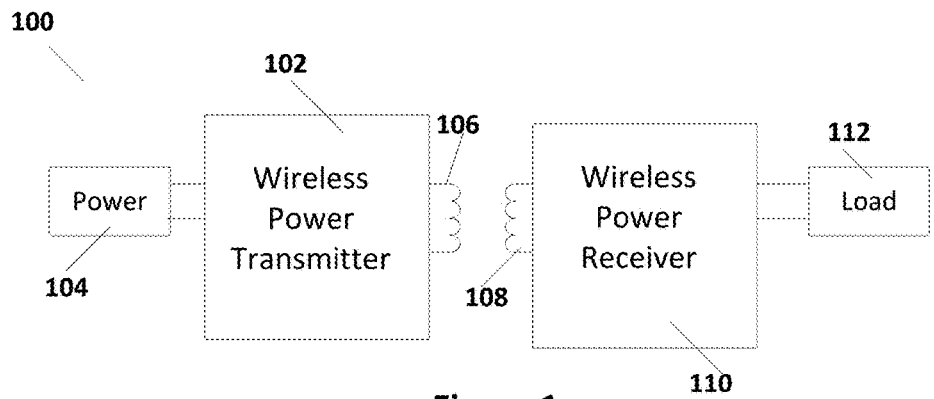
FIG. 1 illustrates a wireless power transmission system.

FIG. 1 illustrates a system 100 for wireless transfer of power. As illustrated in FIG. 1, a wireless power transmitter 102 drives a coil 106 to produce a magnetic field. A power supply 104 provides power to wireless power transmitter 102. Power supply 104 can be, for example, a battery based supply or may be powered by alternating current, for example 120V at 60 Hz. Wireless power transmitter 102 drives coil 106 at, typically, a range of frequencies, typically according to one of the wireless power standards.

There are multiple standards for wireless transmission of power, including the Alliance for Wireless Power (A4WP) standard and the Wireless Power Consortium standard, the Qi Standard. Under the A4WP standard, for example, up to 50 watts of power can be inductively transmitted to multiple charging devices in the vicinity of coil 106 at a power transmission frequency of around 6.78 MHz. Under the Wireless Power Consortium, the Qi specification, a resonant inductive coupling system is utilized to charge a single device at the resonance frequency of the device. In the Qi standard, coil 108 is placed in close proximity with coil 106 while in the A4WP standard, coil 108 is placed near coil 106 along with other coils that belong to other charging devices. FIG. 1 depicts a generalized wireless power system 100 that operates under any of these standards.

As is further illustrated in FIG. 1, the magnetic field produced by coil 106 induces a current in coil 108, which results in power being received in a receiver 110. Receiver 110 receives the power from coil 108 and provides power to a load 112, which may be a battery charger and/or other components of a mobile device. Receiver 110 typically includes rectification along with DC power conversion circuitry to convert the received AC power to DC power appropriate for load 112.

Figure 2:
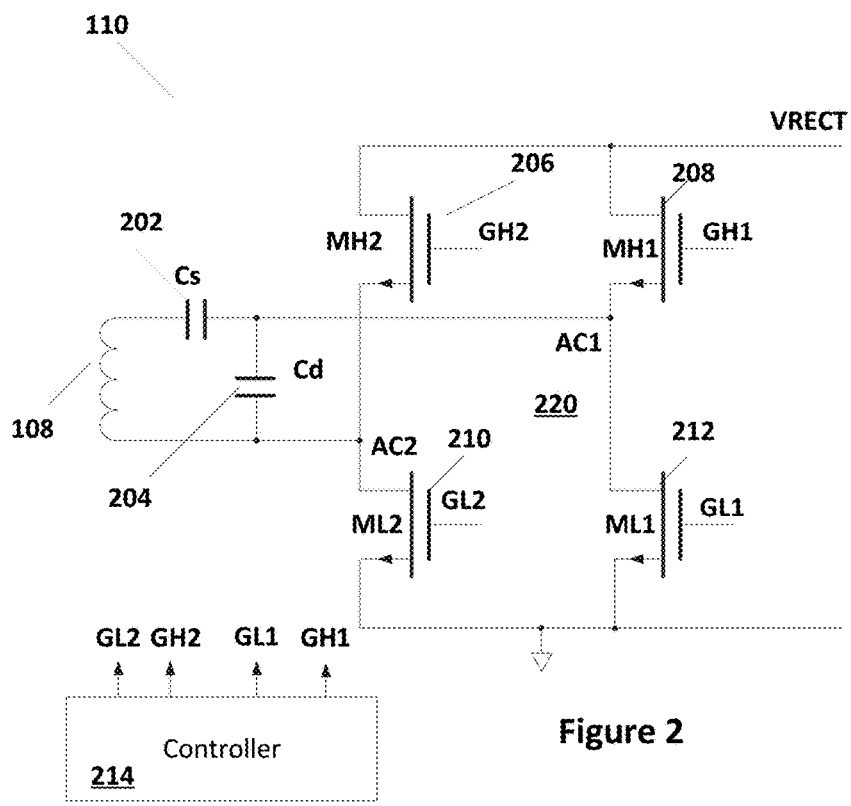
FIG. 2 illustrates a receiver of a wireless power transmission system that can be used in the transmission system illustrated in FIG. 1.

FIG. 2 illustrates an example of a portion of receiver 110 illustrated in FIG. 1. As shown in FIG. 2, coil 108 is coupled through capacitor 202 and capacitor 204 to, in this example, a full-bridge rectifier circuit 220 formed by metal oxide semiconductor field effect transistors (MOSFETs) 206, 208, 210, and 212. Power applied to AC power nodes, illustrated as AC1 and AC2, received from coil 108 is rectified in rectifier 220 to generate rectifier voltage VRECT at a rectifier output node. The gates of transistors 206, 208, 210 and 212, labeled GH2, GH1, GL2, and GL1, respectively, are driven by a controller 214. Controller 214 can drive the gates of transistors 206, 208, 210, and 212 to optimize the delivery of power received at coil 108 and the transfer of rectified power to load 112. In some embodiments, the output from rectifier 220, the voltage labeled VRECT in FIG. 2, may be further filtered and processed prior to assertion across load 112. Transistors 206 and 208 are coupled to the voltage VRECT, which can be placed on a power line, while transistors 210 and 212 are coupled to a ground line. One skilled in the art will recognize that, although a full-bridge rectifier 220 is illustrated in FIG. 2, other embodiments may include a half-bridge rectifier. Further, rectifier 220 may be formed completely or partially of diodes instead of controlled transistors such as transistors 206, 208, 210, and 212.

Some embodiments of the present invention are illustrated using the components of receiver 110. One skilled in the art will recognize how other receivers can be modified to provide further embodiments of the invention. For example, receiver 110 may further include a DC-DC voltage regulator receiving voltage Vrect from the rectifier and providing power to load 112.

The example of receiver 110 illustrated in FIG. 2 may be appropriate for a single standard of wireless power transmission. In general, each standard requires that coil 108 meet specifications specific to that standard. Embodiments of the present invention allow for operation with different standards, for example, a first standard may operate at 6.78 MHz and a second standard may operate at less than 200 KHz.

High frequency wireless power is best received in a high speed rectifier. For example, with the A4WP standard, with an operating frequency of 6.78 MHz, wireless power receivers that adhere to the A4WP standard operate best with a high speed rectifier. In particular, rectifiers that are not high speed rectifier may have difficulty starting and maintaining power rectification in optimal fashion.

Figure 3:
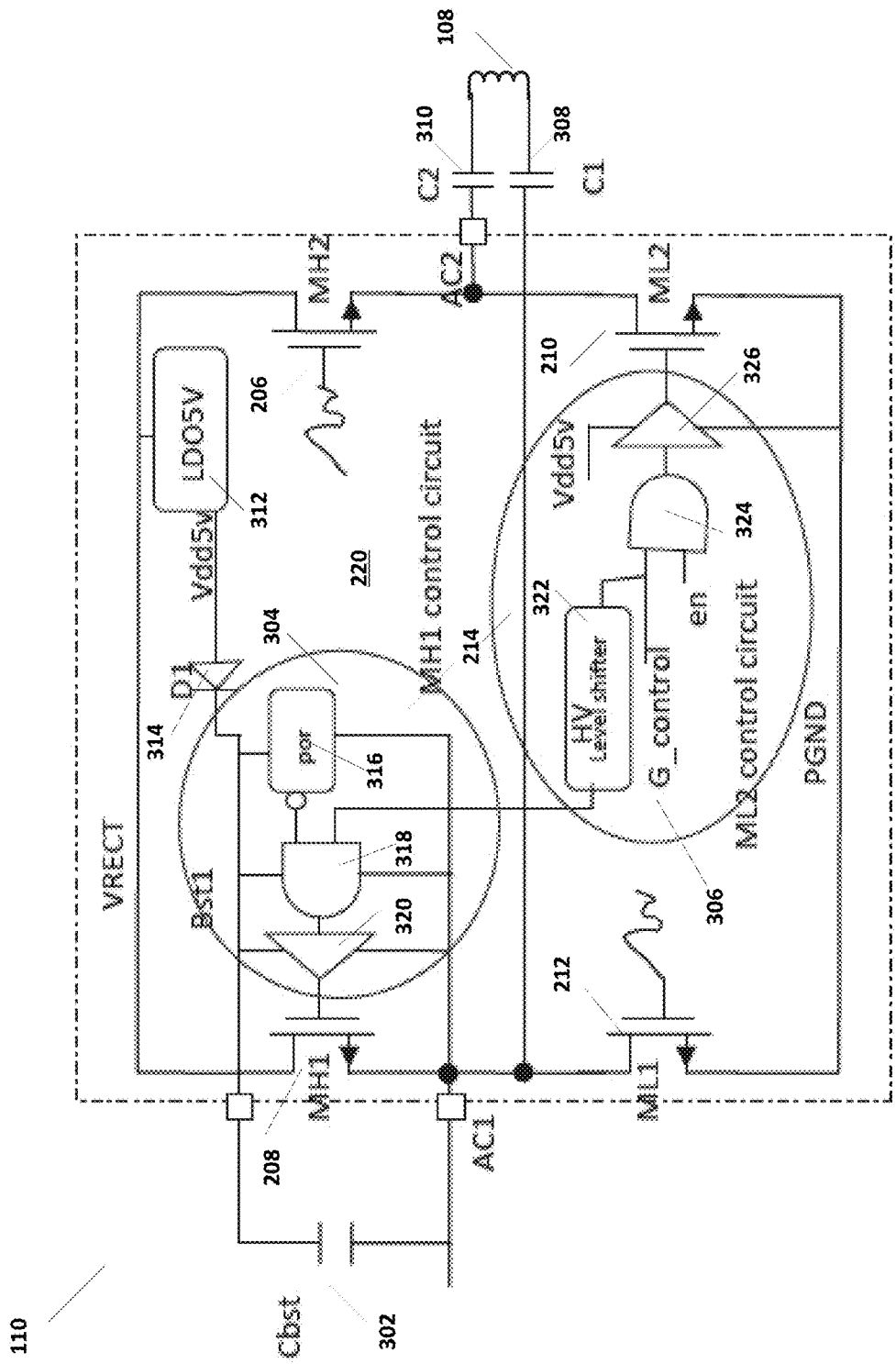
FIG. 3 illustrates further aspects of the receiver illustrated in FIG. 2.

FIG. 3 illustrates an example of rectifier 220 with sections of controller 214 illustrated. In the example illustrated in FIG. 3, controller 214 includes a high control circuit 304 coupled to control transistor 208 and a low control circuit 306 coupled to control transistor 210. Transistors 208 and 210 and transistors 206 and 212 may be large MOS FETs that form the rectifier 220. In general, transistors 208 and 210 are controlled as a pair and transistors 206 and 212 are controlled as a pair. As shown in FIG. 3, high transistor control circuit 304 drives the gate of MH1 transistor 208 and low transistor control circuit 306 drives the gate of ML2 transistor 210. Similarly or identical circuits, which for simplicity are not illustrated here, drive the gates of MH2 transistor 206 and ML1 transistors 212.

As illustrated in FIG. 3, a voltage, designated as Vdd5V and which may be a 5V voltage or other designated voltage, is provided by a low-dropout (LDO) regulator 312. LDO regulator 312 can be powered by the rectifier output, voltage VRECT. The AC voltages at nodes AC1 and AC2 are the received AC voltages from receiver coil 108, as was discussed above.

Control circuit 304 includes a power-on-reset (POR) circuit 316, which receives the output voltage Vdd5V from regulator 312 through an internal diode 314. POR 316 compares the voltage between the output voltage of regulator 312 and the voltage on node AC1 and, depending on that comparison, provides a signal indicating when AC1 is within a range of the voltage Vdd5V and should be applied to the output node. That signal, along with a signal from control signal 306, is input to AND gate 318. The output signal from AND gate 318 is input to driver 320, which drives the gate of transistor 208.

Control circuit 306 includes AND gate 324, which receives signals G_control and the signal en and provides a signal to driver 326. G_control is a rectifier gate control signal, which during start-up is set to low. En is a rectifier enable signal, which is also set to low during start-up. Driver 326 receives voltage Vdd5V from regulator 312 and provides a gate voltage to transistor 210. The signal G-control is provided through a level shifter 322 to provide the signal to AND gate 318 of control circuit 304.

At the time of startup, the low signals are weak lows because the voltage VRECT needs to increase from 0 voltage to its normal (high voltage) operating voltage. However, the gate and drain parasitic capacitances (Cgd) of transistors MH1 208, MH2 206, ML1 212, and ML2 210 can cause those transistors to be weakly on. This will cause current leakage through all four FETs. As a result, the voltage VRECT cannot increase. In that case, the voltage VRECT may stick at a low voltage, for example 1V, and the chip startup fails.

As discussed above, transistors 208 and 210 (along with transistors 212 and 206) are large MOS FETs, the voltage VRECT is the output voltage from rectifier 220, and AC1 and AC2 are the AC inputs to rectifier 220. The voltage VRECT powers LDO5V regulator 312. In some embodiments, regulator 312 can be a 5V LDO. The output voltage, Vdd5v, from regulator 312 charges capacitor Cbst 302 through internal diode D1 314.

As suggested above, the control circuit that drives MH2 transistor 206 can be identical with control circuit 304 and the control circuit that drives ML2 transistor 212 is identical with control circuit 306 that drives ML2 transistor 210. Due to the symmetry, only control circuits that drive transistor 208 and transistor 210 are shown.

If rectifier 220 is a high frequency rectifier, there may be several issues involving rectifier startup. In particular, rectifier startup can be slow or may stick when operation frequency is high. The voltages AC1 and AC2 are coupled through receive coil 108 from a transmitter. Consequently, the initial values of voltage AC1 and AC2 are low. Therefore, the voltage VRECT from rectifier 220 is also very low. The output voltage from regulator 312 is also correspondingly low, resulting in the voltages Vdd5V and Bst1 (the voltage from diode 314) being low.

When the input voltages resulting in the voltage VRECT are less than a threshold, for example less than a diode drop or 0.7V, then control circuit 304 and control circuit 306 cannot function appropriately, resulting in transistors 208, 210 and 206, 212 being uncontrolled or out of control. With the voltage between AC1 and AC2 being a high frequency AC signal, the parasitic capacitances of transistors 208, 206, 210, and 212 dominate the rectifier control.

Figure 4A:
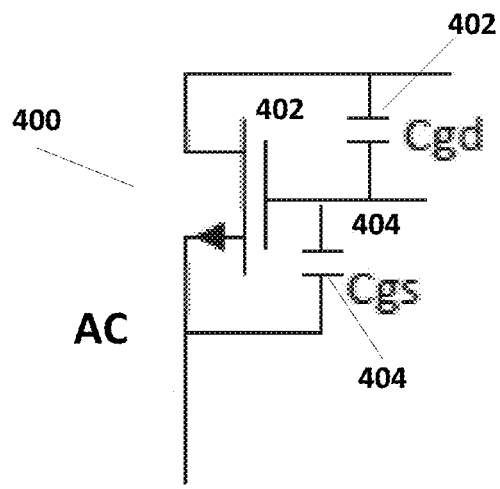
FIG. 4A illustrates the capacitance of a power transistor such as those illustrated in FIG. 2.

FIG. 4A illustrates the parasitic capacitances of a transistor 400. As illustrated in FIG. 4A, transistor 400 includes a parasitic capacitor Cgd 402 between the gate and drain of transistor 400. Further, transistor 400 includes a parasitic capacitor Cgs between the gate and source of transistor 400. If transistor 400 depicts transistor 208. The parasitic capacitors Cgs 402 and Cgd 404 operate as AC resistances, dividing the dominate gate voltage of transistor 208 between BST1 and AC1. The resulting gate-to-source voltage Vgs of transistor 208 is then dominated by the parasitic capacitance as given by Cgd/(Cgs+Cgd). The gate-to-source voltage is given by Vgs=Cgd/(Cgs+Cgd)*(VRECT−AC1). As a consequence, transistor 208 may not be turned off, but may actually be weakly on inappropriately, under high frequency conditions. When VRECT ramps according to a possible current of about 1 A through a pair of transistors (e.g. transistors MH1 208 to ML1 212 or transistors MH2 206 to ML2 210, and the AC1 node is at −0.7V, Vgs can be higher than 0.8V due to the capacitance Cgd being almost equal to or higher than Cgs. Under these conditions, the transistors 206, 208, 210, and 212 will be weakly on, causing rectifier 220 to lock-up or at least for rectifier 220 to start slow.

Consequently, high frequency wireless power, for example for A4WP operating at a frequency of about 6.78 MHz, can benefit from a high speed rectifier design that allows for a quick startup of the rectifier. Rectifier startup will become difficult due to high voltage device gate-to-drain capacitance (Cgd), which may be higher than the gate-to-source capacitance (Cgs).

Figure 4B:
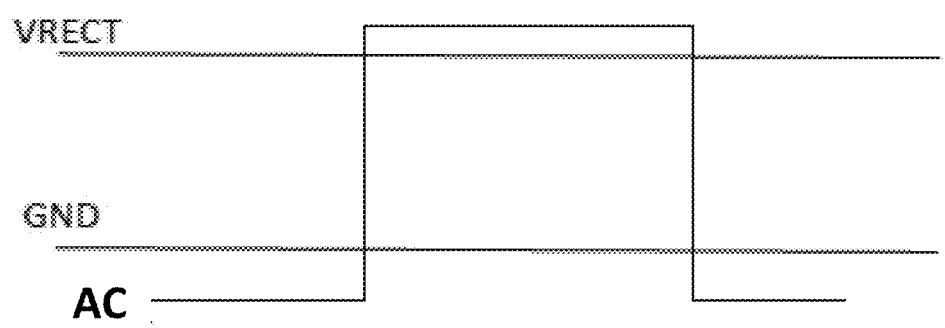
FIG. 4B illustrates an example in a voltage or a current of a rectifier of the receiver as well as the signals around one of the transistors.

As illustrated in FIG. 4A, the gate-to-source voltage of transistor 208 can be given by Vgs=Cdg/(Cgs+Cgd)* (VRECT−AC1). When AC1=−0.7V, VRECT=1V, Vgs can be more than 0.8V. So the large FET 208 turns on. During startup BST1−AC1<0.7V (Vth). POR 316 and controller 304 cannot control transistor 208. At that time, VRECT can be greater than 1V but VDD5V can be less than 0.3 V. FIG. 4B illustrates the AC voltage shown in FIG. 4A with respect to the typical VRECT voltage during operation of transistor 220.

Figure 5:
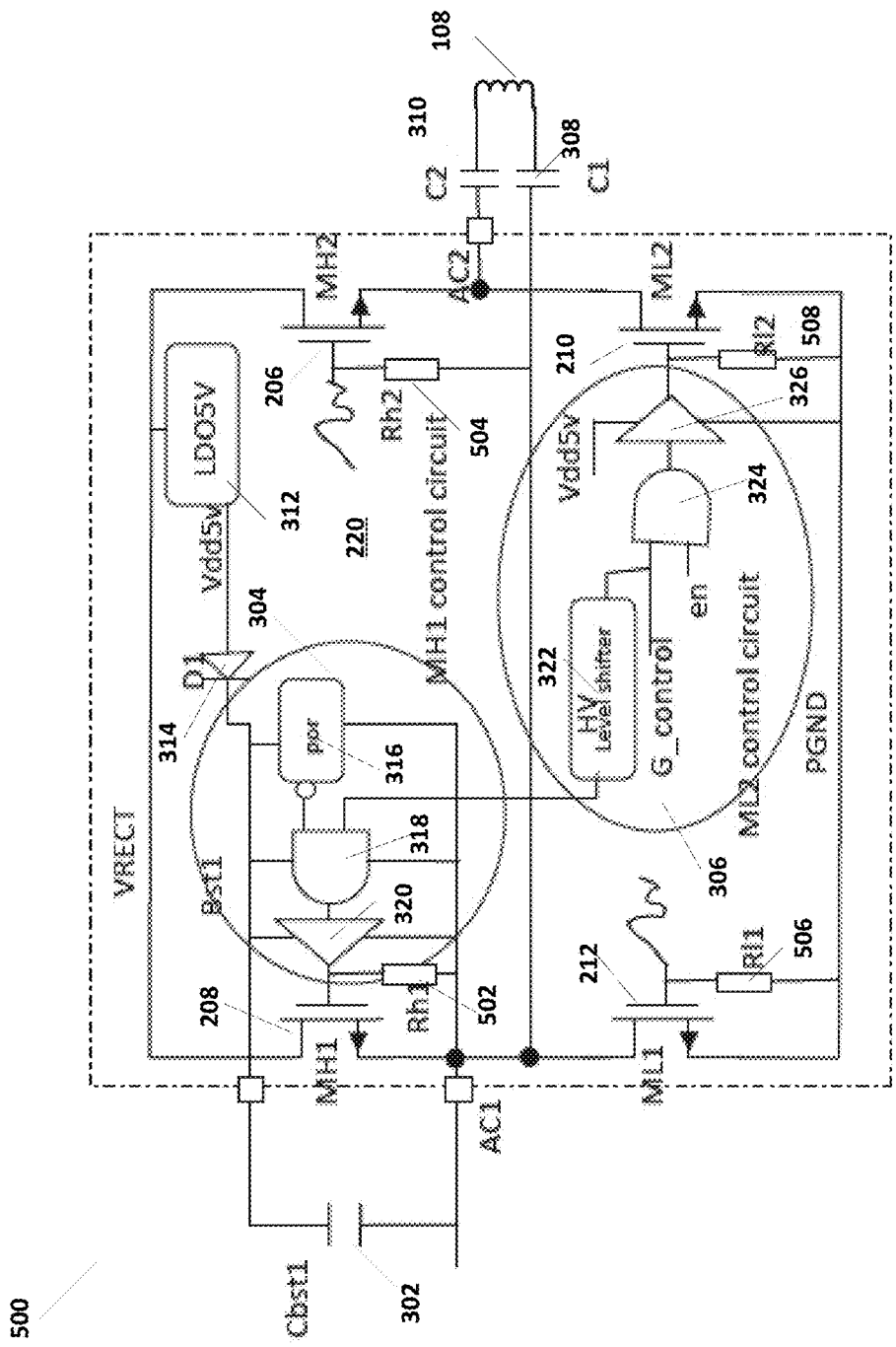
FIG. 5 illustrates a conventional receiver startup circuit.

Generally, the solution to this startup process is to provide pull down resistance from the gates of each of the rectifier transistors in rectifier 220. As illustrated in FIG. 5, resistor 502 is coupled between the gate of transistor 208 and the node AC1; resistor 504 is coupled between the gate of transistor 206 and the node AC1; resistor 506 is coupled between the gate of transistor 212 and the node PGND; and resistor 508 is coupled between the gate of transistor 210 and the node PGND. The signal PGND is the ground line from which the output voltage VRECT is measured.

This works well with a low frequency wireless power resistor because the impedance of the parasitic capacitances is higher. The AC impedance of the gate-to-drain capacitance Cgd is given by 1/(jωCgd). In many cases, the capacitance Cgd is about 50 pF. For example WPC and PMA standard wireless power operation frequency is less than 250 KHz, so the AC impedance is higher than 1/(2π*250 KHz*50 pF)=12K Ohms. Consequently, at these operating frequency, the addition of a pull down resistor is not a big issue for the operating power loss of rectifier 220.

However, in the case of higher frequency systems, for example in A4WP standard wireless power operation frequency of 6.78 MHz, the AC impedance of the parasitic capacitances will drop to about 400Ω. Then, if there is a pull down resistor the power dissipation of rectifier 220 will become very large, and the power loss, and heat dissipation, in individual transistors 400 may also be a problem.

Figure 6:
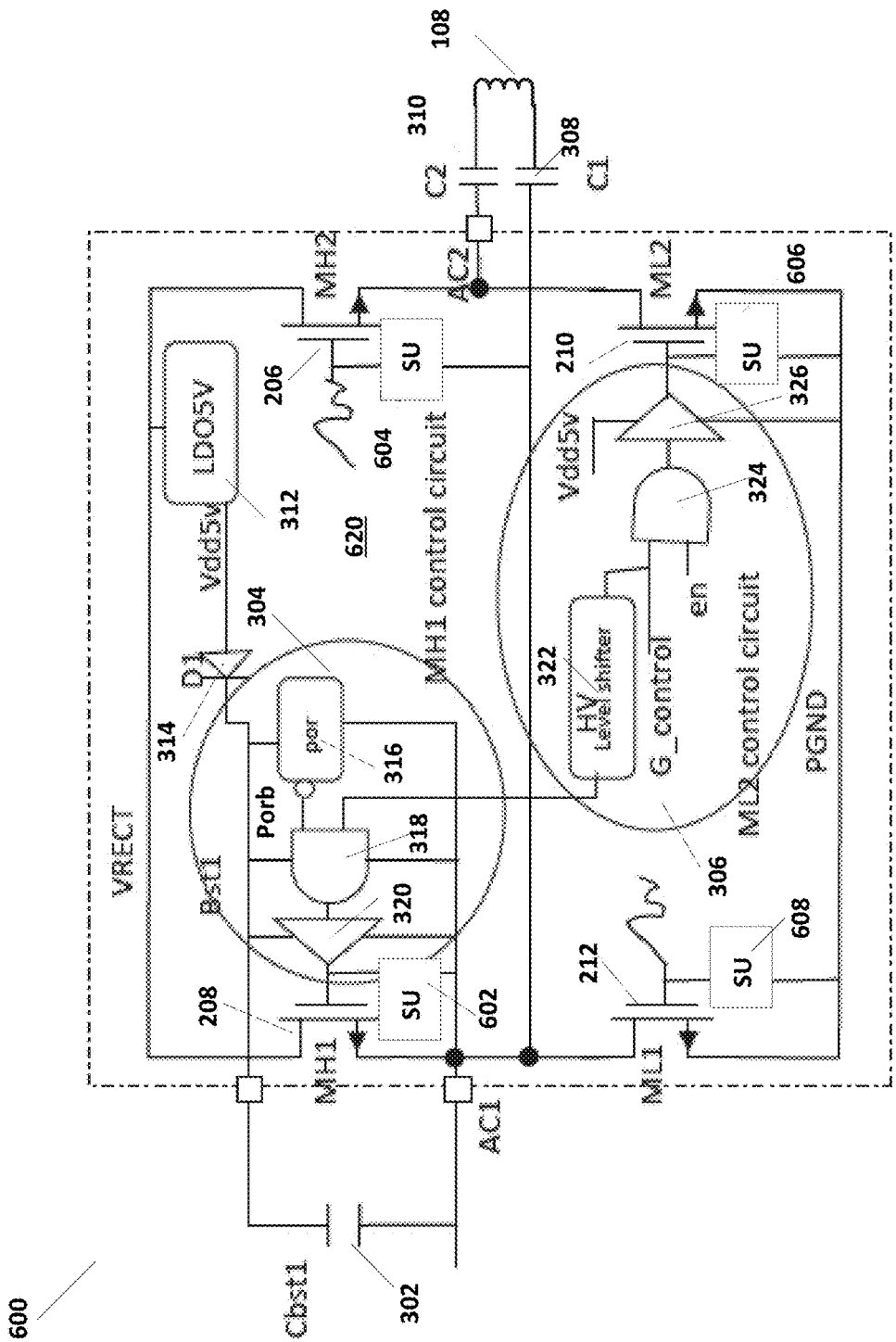
FIG. 6 illustrates a receiver with a startup circuit according to some embodiments of the present invention.

FIG. 6 illustrates a rectifier 620 according to some embodiments of the present invention. As illustrated in FIG. 6, a startup circuit 602 is provided between the gate of transistor 208 and node AC1. Further, a startup circuit 604 is provided between the gate of transistor 206 and node AC1; a startup circuit 608 is provided between the gate of transistor 212 and the ground node PGND; and a startup circuit 606 is provided between the gate of transistor 210 and the ground node PGND. Startup circuits 602, 604, 606, and 608 provide, similar to the resistances illustrated in FIG. 5, a pull-down impedance during a startup period of time. Startup circuits 602, 604, 606 and 608 shuts off the corresponding transistors 208, 206, 210, and 212, respectively. At this point, rectifier 600 is formed by the body diodes of transistors 206, 208, 210, and 212.

When rectifier 600 begins to operate normally, the pull-down impedances of startup circuits 602, 604, 606 and 608 can be disabled, removed, or otherwise disengaged, for example after a startup period of time, after which transistors 206, 208, 210, and 212 can be actively operated by other circuits. The startup period of time can be the time starting when power is first applied across nodes AC1 and AC2 by coil 108 and ending after the voltage on the rectifier output, VRECT, has reached a threshold value and rectifier 620 can be deemed to be operating normally. Such a system can avoid large amounts of power dissipation resulting from permanently applied pull-down resistors as illustrated in FIG. 5. Startup circuits 602, 604, 606, and 608 can be any circuit that provides control for rectifier transistors 208, 206, 210, and 212, respectively, during the startup period and removes control during normal operating times.

Figure 7:
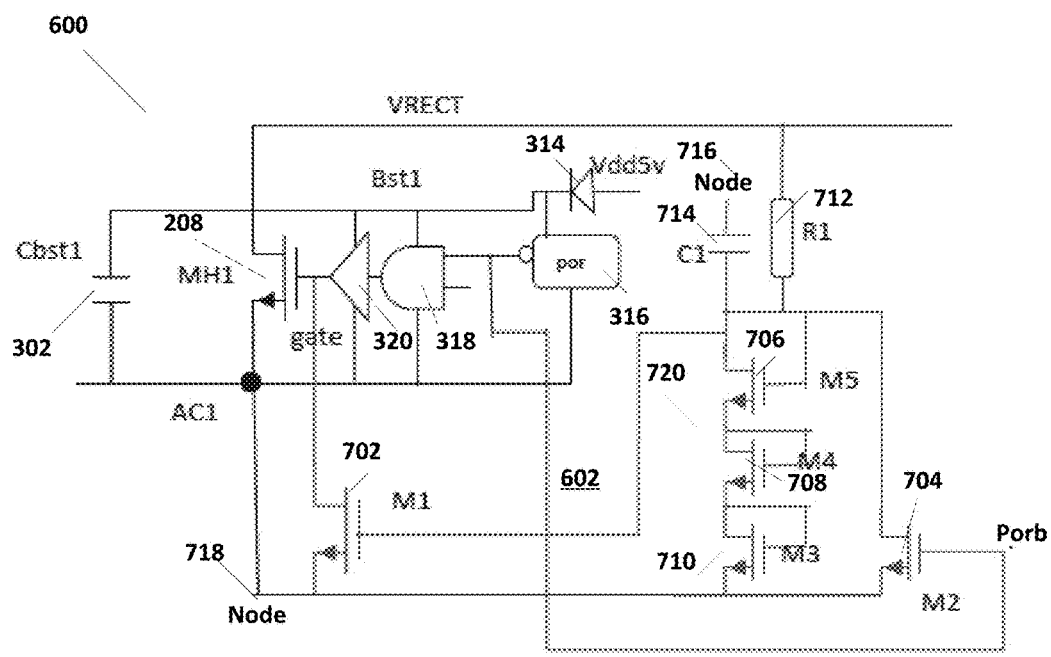
FIG. 7 illustrates an embodiment of the startup circuit illustrated in FIG. 6.

FIG. 7 illustrates an example of start-up circuit 602 coupled to the gate of transistor 208. A similar or the same circuit can be attached to the gates of transistors 206, 210, and 212 as well, as illustrated in FIG. 6, to form shutdown circuits 604, 606, and 608, respectively.

As shown in FIG. 7, start-up circuit 602 includes a transistor 702 coupled between the gate of transistor 208 and node 718, which in this example is node AC1. As is further illustrated, a capacitor C1 714 is coupled between a node 716, which in this case can be either the voltage VRECT on the rectifier output or voltage AC2 on node AC2. A transistor 704 is further coupled between the gate of transistor 702 and node 718. The gate of transistor 704 is coupled to receive the output voltage of POR 316 (Porb). As a result of this configuration, transistor 702 is turned on until transistor 704 is on pulling the gate of transistor 208 to the voltage of node 718. When the voltage porb becomes sufficiently large, transistor 704 turns on, driving the gate of transistor 702 to ground effectively turning transistor 702 off.

Startup circuit 602 further includes a circuit 720, which includes series connected transistors 706, 708, and 710, coupled between the gate of transistor 702 and node 718. A resistor 712 is coupled between the voltage VRECT and transistor 706. Transistor 704 is coupled in parallel with series coupled transistors 706, 708, and 710. The gate of transistor 704 is coupled to the output of POR 316, voltage Porb.

The node 716 can be connected to either AC2 or the voltage VRECT for control of transistor 208. The node 716 can be connected to either AC1 or the voltage VRECT for control of transistor 206. The node 716 can be connected to AC1 or the voltage VRECT for control of transistor 212. The node 716 can be connected to AC2 or the voltage VRECT for control of transistor 210. Similarly, node 718 represents AC1 for control of transistors 208 and 206 and represents PGND for control of transistors 210 and 212.

Capacitor C1 714 is a small AC coupling capacitor that is coupled to node 716, which is either an AC voltage or to the DC voltage VRECT. The resistor R1 712 similarly functions with capacitor C1 714 to help transistor 208 turn on during initial startup. For example, in FIG. 7 at startup AC1 can be −0.7V, AC2 can be 1.7 V, VRECT can be 1V then the output of POR 316 is low so that control circuit 304 has no headroom. However, transistor 702 will be fully turned on due to capacitor C1 714 and resistor R1 712 pulling the gate of transistor 702 towards voltage VRECT. Consequently, the gate of transistor 208 will be pulled to node 718 (AC1) and transistor 208 turned off. Consequently, transistor 208 is controlled even at very low voltage during the startup phase.

After startup, the output from POR 316 becomes sufficient to turn transistor 704 on, which shuts transistor 702 off. In that case, capacitor C1 714 and resistor R1 712 are coupled through transistor 704 to node 718, which in the case of start-up circuit 602 is node AC1. At that point, the power loss due to start-up circuit 602 during normal operation is due to the coupling of capacitor 714 and resistor 712 to node 718 while transistor 704 is on.

This impedance can represent a substantially lower power loss than that illustrated in the arrangement of FIG. 5. In the configuration illustrated in FIG. 5, the resistors 502, 504, 506, and 508 are impedance matched with the capacitances Cgd AC impedances, so those resistances as discussed above are less than a few kΩ. During normal operation, the resistors 502, 504, 506 and 508 can cause a large power dissipation. Resistor 712 illustrated in FIG. 7, however, can be a few hundred kΩ and the resulting combined impedance of capacitor 714 and resistor 712 can be very large as compared to the impedance illustrated in FIG. 5. Consequently, the amount of power dissipated during normal operations in the circuit illustrated in FIG. 7 is substantially reduced.

Figure 8A:
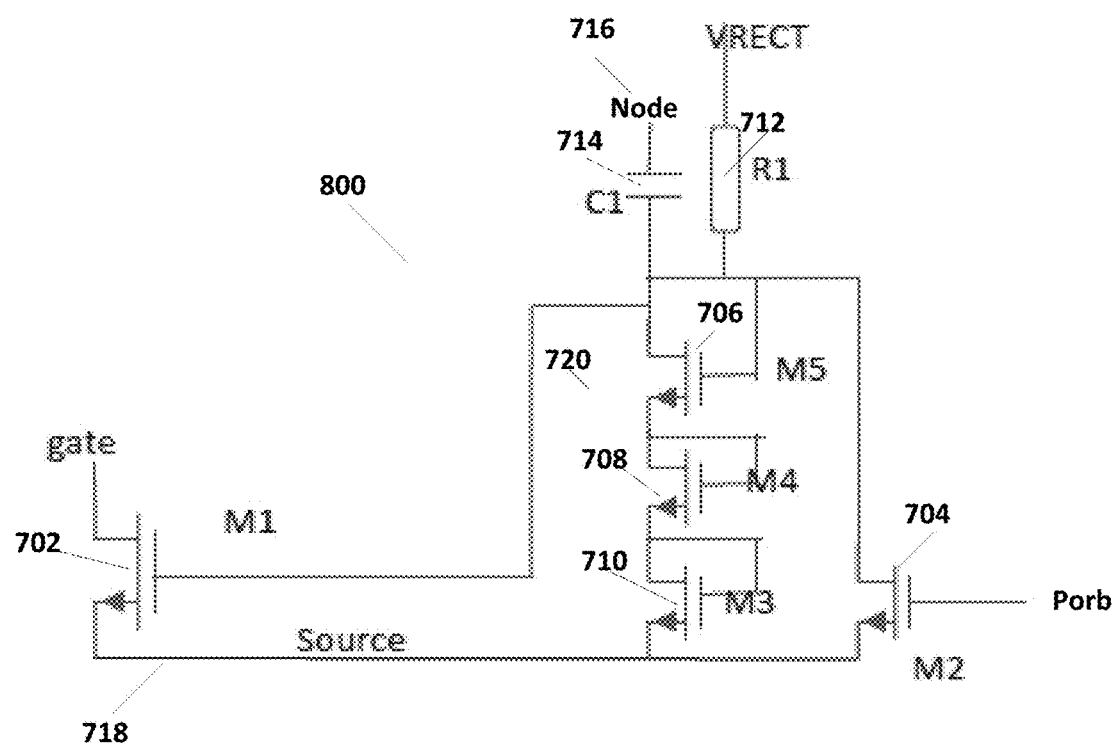
FIGS. 8A, 8B, and 8C illustrate further examples of startup circuits according to embodiments of the present invention.
Figure 8B:
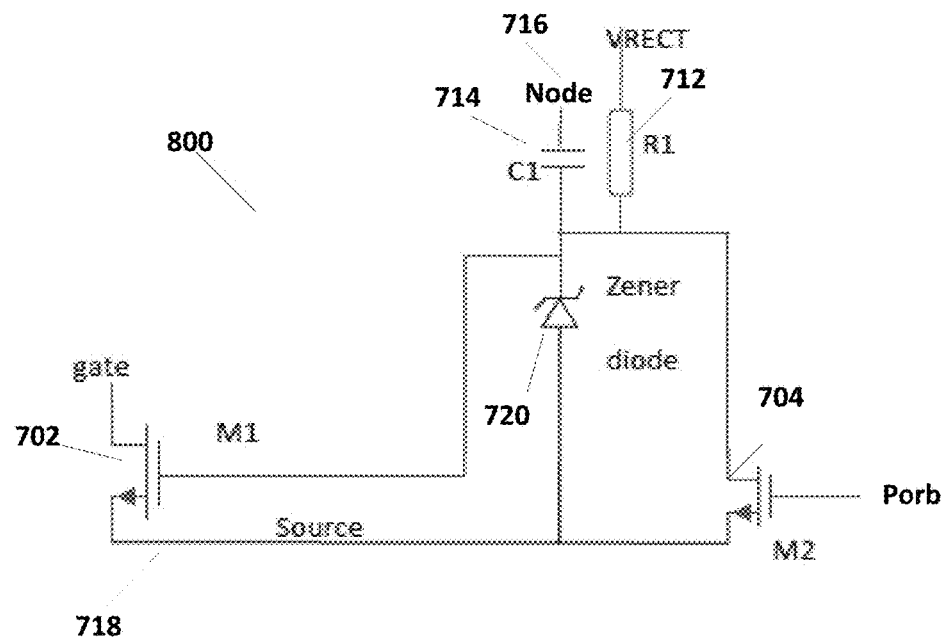
Figure 8C:
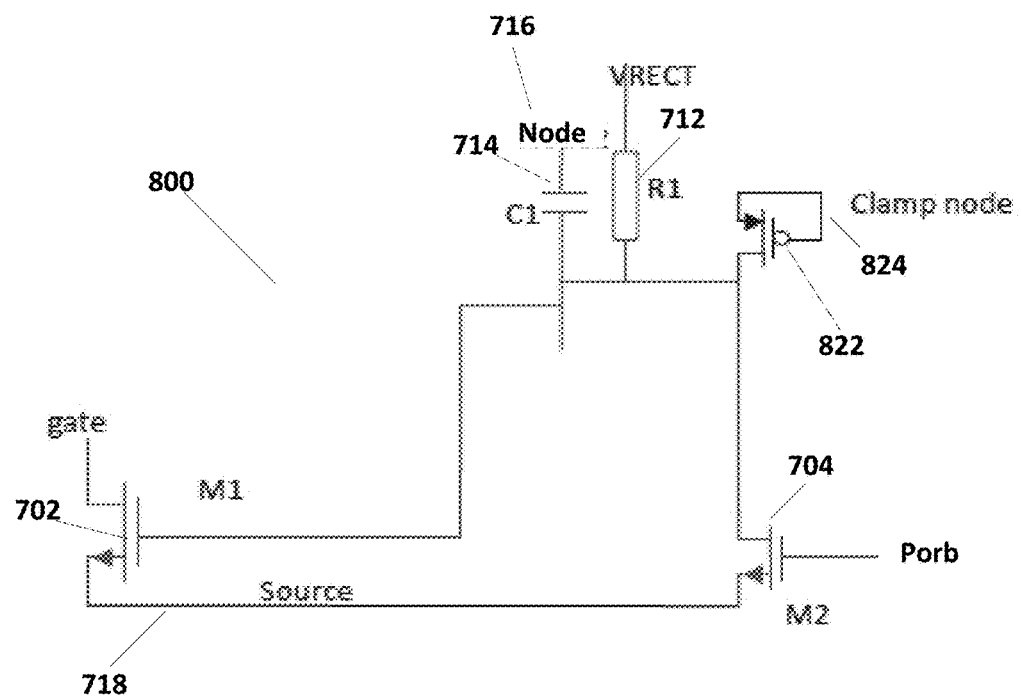

FIGS. 8A, 8B, and 8C illustrate examples of a startup circuit 800 according to some embodiments of the present invention. Start-up circuit 800 can depict any one of start-up circuits 602, 604, 606, or 608 as illustrated in FIG. 6. FIG. 8A illustrates startup circuit 602 as illustrated, for example, in FIG. 7, but can also be used for startup circuits 604, 606, or 608.

FIG. 8A illustrates an example of startup circuit 800 as illustrated in startup circuit 602 illustrated and discussed with respect to FIG. 7. As discussed above, startup circuit 800 can be used as any of startup circuits 602, 604, 606, and 608 with transistor 702 coupled to the gate of the respective transistor 208, 206, 210, and 212 as illustrated in FIG. 6 and with the gate of transistor 704 input to receive the output signal Porb from power-on-reset 316 or the respective circuit associated with the transistor pair 206 and 212 as illustrated in FIG. 6.

FIG. 8B illustrates another example of startup circuit 800 where circuit 720, which is illustrated in the example of FIG. 8A as series connected transistors 706, 708, and 710, is a zener diode. FIG. 8C illustrates another example of startup circuit 800 where circuit 720 is removed and a clamp 822, which may be a pMos clamp, clamps the gate of transistor 702 to a clamp node 824. Clamp node 824 is any DC or AC voltage that can protect the gate of transistor 702. Further, in some embodiments startup circuit 800 may include only one of capacitor 714 and resistor 712 and may not include both of these resistive elements.

The above detailed description is provided to illustrate specific embodiments of the present invention and is not intended to be limiting. Numerous variations and modifications within the scope of the present invention are possible. The present invention is set forth in the following claims.

What is claimed is:

1. A rectifier, comprising:
   a first transistor and a second transistor coupled in series between a rectifier output and a ground, wherein a first AC input is coupled to a first node between the first transistor and the second transistor;
   a third transistor and a fourth transistor coupled in series between the rectifier output and the ground, wherein a second AC input is coupled to a second node between the third transistor and the fourth transistor;
   a first control circuit coupled between a gate of the first transistor and a gate of the fourth transistor to control operation of the first and the fourth transistors;
   a first startup circuit directly connected between the gate of the first transistor and the first node, the first startup circuit controlling the gate of the first transistor in a startup time period prior to an operating period of the rectifier, wherein the first startup circuit maintains a low impedance between the gate of the first transistor and the first node during a startup time and maintains a high impedance between the gate of the first transistor and the first node during the operating period of the rectifier; and
   a second startup circuit directly connected between the gate of the fourth transistor and the ground.

2. The rectifier of claim 1,
   wherein the second startup circuit controls the gate of the fourth transistor in the startup time period such as to maintains a low impedance between the gate of the fourth transistor and the ground during the startup time and maintains a high impedance between the gate of the fourth transistor and the ground during the operating period of the rectifier.

3. The rectifier of claim 1, further comprising
   a second control circuit coupled between a gate of the third transistor and a gate of the second transistor to control operation of the third and the second transistors; and
   a third startup circuit coupled between the gate of the third transistor and the first node, wherein the third startup circuit maintains a low impedance between the gate of the third transistor and the first node during the startup time and maintains a high impedance between the gate of the third transistor and the first node during the operating period of the rectifier.

4. The rectifier of claim 3, further comprising a fourth startup circuit coupled between the gate of the second transistor and the ground wherein the fourth startup circuit maintains a low impedance between the gate of the second transistor and the ground during the startup time and maintains a high impedance between the gate of the second transistor and the ground during the operating period of the rectifier.

5. The rectifier of claim 1, wherein the first startup circuit comprises:
   a first control transistor coupled between the gate of the first transistor and the first node;
   a resistive element coupled to a gate of the first control transistor; and a second control transistor coupled between the gate of the first control transistor and the first node, a gate of the second control transistor coupled to the first control circuit, wherein the first control transistor is turned on by the resistive element during the startup time period and is turned off by the second control transistor during the operating period.

6. The rectifier of claim 5, wherein the resistive element includes a resistor coupled between the gate of the first control transistor and a voltage node.

7. The rectifier of claim 6, wherein the voltage node is the rectifier output.

8. The rectifier of claim 6, further including a capacitor coupled between the gate of the first control transistor and a control node.

9. The rectifier of claim 8, wherein the control node is one of the rectifier output or the second AC input.

10. A startup circuit for a rectifier, comprising:
a first control transistor directly connected between a gate of a rectifier transistor and a first node;
a resistive element coupled to a gate of the first control transistor, the resistive element including at least one of a resistor and a capacitor coupled between the gate of the first control transistor and one of an AC input node or a rectifier output node; and
a second control transistor coupled between the gate of the first control transistor and the first node, a gate of the second control transistor coupled to a control circuit of the rectifier,
wherein the first control transistor is turned on by the resistive element during a startup time period to maintain a low impedance path between the gate of the rectifier transistor and the first node and is turned off by the second control transistor to maintain a high impedance between the gate of the rectifier transistor and the first node during an operating period.

11. The startup circuit of claim 10, further including a circuit coupled between the gate of the first control transistor and the first node.

12. The startup circuit of claim 11, wherein the circuit includes a plurality of series coupled transistors.

13. The startup circuit of claim 11, wherein the circuit includes a zener diode.

14. The startup circuit of claim 10, further including a clamp circuit coupled to the gate of the first control transistor.

15. A rectifier circuit, comprising:
a plurality of FETs arranged as a rectifier; and
a plurality of start-up circuits, each of the plurality of start-up circuits is applied to a corresponding FET of the plurality of FETs, a startup circuit of the plurality of start-up circuits turns its corresponding FET of the plurality of FETs off during a circuit startup period,
wherein each of the plurality of start-up circuits provides a large impedance for low power dissipation during normal operation of the rectifier,
wherein each of the start-up circuits includes a first control transistor directly connected between a gate of the corresponding FET of the plurality of FETs and a node, a resistive element coupled to a gate of the first control transistor; and a second control transistor coupled between the gate of the first control transistor and the node, a gate of the second control transistor coupled to a control circuit of the rectifier, and
wherein the first control transistor is turned on by the resistive element during the circuit startup period to maintain a low impedance path between the gate of the corresponding FET of the plurality of FETs and the node and is turned off by the second control transistor to maintain a high impedance between the gate of the corresponding FET of the plurality of FETs and the node during the normal operation of the rectifier.

16. The rectifier circuit of claim 15, wherein the plurality of FETs includes four FETs.

* * * * *